United States Patent
Becker

(10) Patent No.: US 6,873,826 B2
(45) Date of Patent: Mar. 29, 2005

(54) METHOD AND MOBILE STATION FOR REPORTING MULTI-PATH SIGNALS BASED ON MINIMUM SEPARATION

(75) Inventor: Christopher J. Becker, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 351 days.

(21) Appl. No.: 10/213,805

(22) Filed: Aug. 6, 2002

(65) Prior Publication Data

US 2004/0198377 A1 Oct. 7, 2004

(51) Int. Cl.$^7$ .......................... H04B 17/00; H04B 7/216
(52) U.S. Cl. .................... 455/67.11; 455/434; 455/513; 455/514; 370/342; 375/149; 375/137
(58) Field of Search .......................... 455/422.1, 432.1, 455/434, 435.1, 436, 437, 450, 509, 513, 514, 515, 67.11, 134; 370/335, 342, 441; 375/147, 149, 136, 137

(56) References Cited

U.S. PATENT DOCUMENTS

| | | | | |
|---|---|---|---|---|
| 5,490,165 A | * | 2/1996 | Blakeney et al. | 370/335 |
| 5,577,022 A | * | 11/1996 | Padovani et al. | 455/434 |
| 5,627,835 A | * | 5/1997 | Witter | 375/147 |
| 5,726,982 A | * | 3/1998 | Witter | 375/147 |
| 5,889,768 A | * | 3/1999 | Storm et al. | 455/436 |
| 5,920,549 A | * | 7/1999 | Bruckert et al. | 455/436 |
| 5,953,382 A | * | 9/1999 | Asano et al. | 375/147 |
| 5,987,012 A | * | 11/1999 | Bruckert et al. | 370/342 |
| 5,987,016 A | * | 11/1999 | He | 370/342 |
| 6,078,611 A | * | 6/2000 | La Rosa et al. | 375/147 |
| 6,269,075 B1 | * | 7/2001 | Tran | 375/147 |
| 6,408,039 B1 | * | 6/2002 | Ito | 370/335 |
| 6,445,728 B1 | * | 9/2002 | Byun | 370/342 |
| 6,600,777 B1 | * | 7/2003 | Glazko | 375/148 |
| 6,674,793 B2 | * | 1/2004 | Smolyar et al. | 375/150 |
| 6,680,968 B2 | * | 1/2004 | Black et al. | 375/149 |
| 6,683,924 B1 | * | 1/2004 | Ottosson et al. | 370/342 |
| 2002/0094017 A1 | * | 7/2002 | Wang | 375/144 |
| 2003/0012312 A1 | * | 1/2003 | Gerhards et al. | 375/150 |
| 2003/0013457 A1 | * | 1/2003 | Amerga et al. | 455/456 |
| 2003/0039228 A1 | * | 2/2003 | Shiu et al. | 370/342 |
| 2003/0043889 A1 | * | 3/2003 | Kang et al. | 375/147 |
| 2003/0086396 A1 | * | 5/2003 | Gurski et al. | 370/342 |
| 2003/0134652 A1 | * | 7/2003 | Ben-Eli | 455/515 |
| 2003/0152167 A1 | * | 8/2003 | Oh et al. | 375/326 |
| 2003/0157892 A1 | * | 8/2003 | Reznik et al. | 455/67.1 |
| 2003/0220120 A1 | * | 11/2003 | Hagin-Metzer et al. | 455/504 |
| 2004/0029589 A1 | * | 2/2004 | Becker et al. | 455/437 |

FOREIGN PATENT DOCUMENTS

WO        99/23770     *  5/1999    ........... H04B/7/216

* cited by examiner

*Primary Examiner*—Rafael Perez-Gutierrez
(74) *Attorney, Agent, or Firm*—Marshall, Gerstein & Borun LLP

(57) ABSTRACT

A method (700) and a mobile station (160) for reporting multi-path signals based on minimum separation are described herein. The mobile station (160) may include a list with a first energy/position pair corresponding to the energy parameter and the position parameter associated with a first multi-path signal of a synchronization code. The mobile station (160) may generate a second energy/position pair corresponding to the energy parameter and the position parameter of a second multi-path signal. The mobile station (160) may detect the position parameter of the second energy/position pair being within a minimum separation associated with the position parameter of the first energy/position pair. The mobile station (160) may also detect the energy parameter of the second energy/position pair being greater than the energy parameter of the first energy/position pair. Accordingly, the mobile station (160) may replace the first energy/position pair on the list with the second energy/position pair.

26 Claims, 7 Drawing Sheets

METHOD AND MOBILE STATION FOR REPORTING MULTI-PATH SIGNALS BASED ON MINIMUM SEPARATION

TECHNICAL FIELD

The present disclosure relates to wireless communication systems, and more particularly, to a method and a mobile station for reporting multi-path signals based on minimum separation.

BACKGROUND

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

Typically, the mobile station may detect the presence of multiple base stations that are operable to provide communication services to the mobile station. To assist with synchronization between the mobile station and those base stations, beacon signals are transmitted. In a Third Generation Partnership Project (3GPP) system, for example, the beacon signal is known as a primary synchronization code (PSC) that is transmitted once per slot. The strongest path for the beacon signal is a direct line-of-sight (LOS) path from the base station to the mobile station. However, the signal may reflect off of objects such as buildings and mountains. The mobile station may receive a reflected version of the signal somewhat later than the version via the direct LOS path because the reflected version of the signal may have traveled a longer path to reach to the mobile station, i.e., multi-path signals. Thus, the mobile station performs a searching process to scan through the phase space of the synchronization code looking for valid signals. Based on the energy level of a multi-path signal, the mobile station determines whether to store and report the multi-path signal as a valid signal on a list of possible start points of the synchronization code. Based solely on the energy level of multi-path signals, the mobile station may produce a significant number of results to report.

One aspect of designing a wireless communication system is to reduce the size and consumption power of the mobile station. In particular, one method of improving the availability of resources is to reduce the processing and memory requirements of the mobile station. That is, the loading of the digital signal processor (DSP) and the number of direct memory access (DMA) transfers during a search for multi-path signals may need to be reduced. Therefore, a need exists for a more effective means to process, store, and report results from a search for multi-path signals.

BRIEF DESCRIPTION OF THE DRAWINGS

This disclosure will describe several embodiments to illustrate its broad teachings. Reference is also made to the attached drawings.

DETAILED DESCRIPTION

Figure 1:
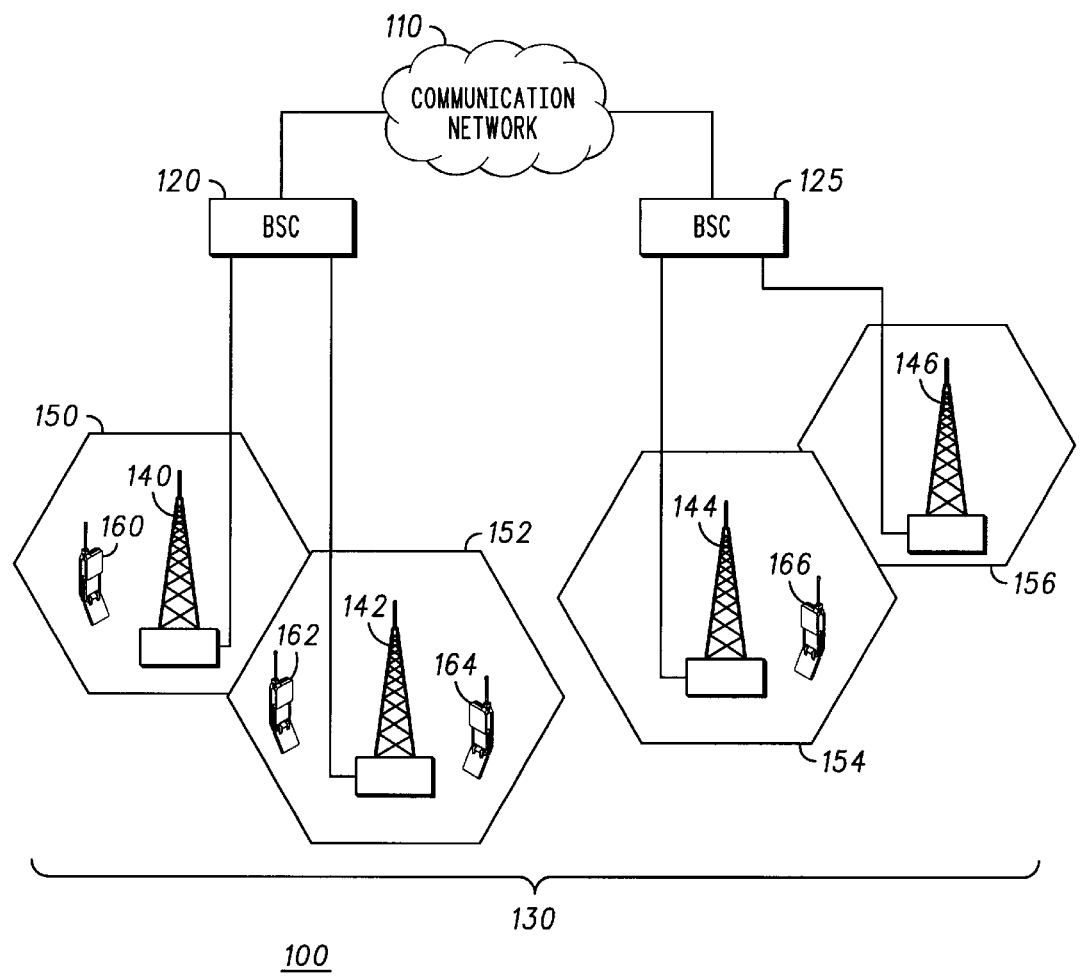
FIG. 1 is a block diagram representation of a wireless communication system.

A method and a mobile station for reporting multi-path signals based on minimum separation are described herein. The mobile station may store a list including at least one energy/position pair associated with a multi-path signal. Each energy/position pair may correspond to an energy parameter and a position parameter associated with a multi-path signal. The energy parameter (i.e., the height of an energy/position pair) may correspond to the energy or signal strength of a particular multi-path signal. The position parameter (i.e., the location of an energy/position pair) may correspond to the relative delay or offset of the particular multi-path signal within a synchronization code. The list may include a first energy/position pair corresponding to the energy parameter and the position parameter associated with a first multi-path signal of a synchronization code. During a search for multi-path signals, the mobile station may generate a second energy/position pair associated with a second multi-path signal. The second energy/position pair may correspond to the energy parameter and the position parameter associated with the second multi-path signal. Based on the position parameter and the energy parameter associated with the first and second energy/position pairs, the mobile station may determine whether to replace the first energy/position pair on the list with the second energy/position pair. In particular, the mobile station may detect the position parameter of the second energy/position pair being within a minimum separation associated with the position parameter of the first energy/position pair. For example, the first energy/position pair may correspond to Position 3 within the synchronization code whereas the second energy/position pair may correspond to Position 6. If the minimum separation is set to a value of more than three (3) positions (e.g., four (4) positions) then the second energy/position pair may violate the minimum separation associated with the position parameter of the first energy/position pair because Positions 3 and 6 are separated by only three (3) positions (i.e., the second energy/position pair is within the minimum separation associated with the position parameter of the first energy/position pair). Upon detecting a violation of the minimum separation associated with the first energy/position pair, the mobile station may determine whether the energy parameter of the second energy/position pair is greater than the energy parameter of the first energy/position pair. For example, the mobile station may compare the signal strengths of the first and second energy/position pairs. If the energy parameter of the second energy/position pair is greater than the energy parameter of the first energy/position pair then the mobile station may replace the first energy/position pair on the list with the second energy/position pair. That is, the mobile station may delete the first energy/position pair from the list, and store the second energy/position pair on the list.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, CDMA 2000, the Personal Communications System (PCS), 3G, the Universal Mobile Telecommunications System (UMTS) and variations and evolutions of these protocols. Referring to FIG. 1, a wireless communication system 100 includes a communication network 110, and a plurality of base station controllers (BSC), generally shown as 120 and 122, servicing a total service area 130. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
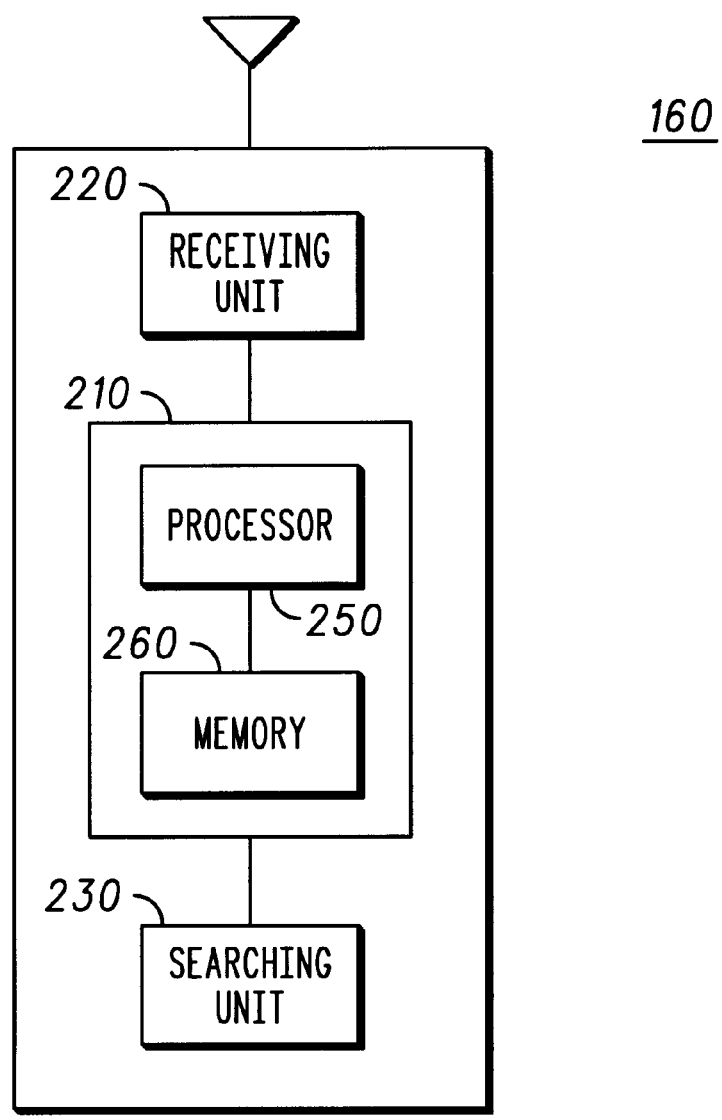
FIG. 2 is a block diagram representation of a mobile station.

Referring to FIG. 2, a mobile station (one shown as 160 in FIG. 1) adapted to report for multi-path signals based on minimum separation is shown. The mobile station 160 generally includes a controller 210, a receiving unit 220, and a searching unit 230. The controller 210 includes a processor 250 and a memory 260. The processor 250 is operatively coupled to the memory 260, which stores a program or a set of operating instructions for the processor 250. The processor 250 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The controller 210 may be operatively coupled to the receiving unit 220, which may be, but is not limited to, a RAKE receiver as persons of ordinary skill in the art will readily recognize. As noted above, the mobile station 160 may receive different versions of an original signal (i.e., multi-path signals) because the signal may reach the mobile station 160 via a direct path and/or reflections off of objects such as buildings and mountains. Thus, the receiving unit 220 may be configured to demodulate multi-path signals so that the original signal may be retrieved. Further, the controller 210 may be operatively coupled to the searching unit 230. The searching unit 230 may be configured to report multi-path signals demodulated by the receiving unit 220.

A basic flow for reporting multi-path signals based on minimum separation that may be applied with the mobile station 160 shown in FIG. 2 may start with the mobile station 160 (e.g., via the searching unit 230) identifying a base station (one shown as 140 in FIG. 1) to establish a link for communication services. The mobile station 160 may search for multi-path signals associated with a synchronization code, which may provide information associated with establishing a communication link with the base station 140. Using the receiving unit 220, the mobile station 160 may receive multi-path signals associated with the synchronization code. Accordingly, the mobile station 160 may generate an energy/position pair associated with each multi-path signal. In particular, the energy/position pair may include an energy parameter and a position parameter. The energy parameter may correspond to signal strength of a multi-path signal, and the position parameter may correspond to the position of the multi-path signal. As used herein "position" refers to the space and/or time of a signal relative to other multi-path signals within the synchronization code. In particular, the synchronization code may include 5,120 positions in which a multi-path signal may be located.

To optimize communication resources, the mobile station may reduce the number of energy/position pairs stored on a list of possible start points of the synchronization code. In particular, the mobile station 160 may compare the position parameters of a stored energy/position pair and a detected energy/position pair. The stored energy/position pair may be an energy/position pair stored on a list of energy/position pairs associated with multi-path signals whereas the detected energy/position pair may be associated with a multi-path signal received by the mobile station 160 via the receiving unit 220. The mobile station 160 may determine whether the position parameter of the detected energy/position pair is within a minimum separation associated with the position parameter of the stored energy/position pair. The minimum separation may be, but is not limited to, a pre-programmed value and a user-selectable value.

Figure 3:
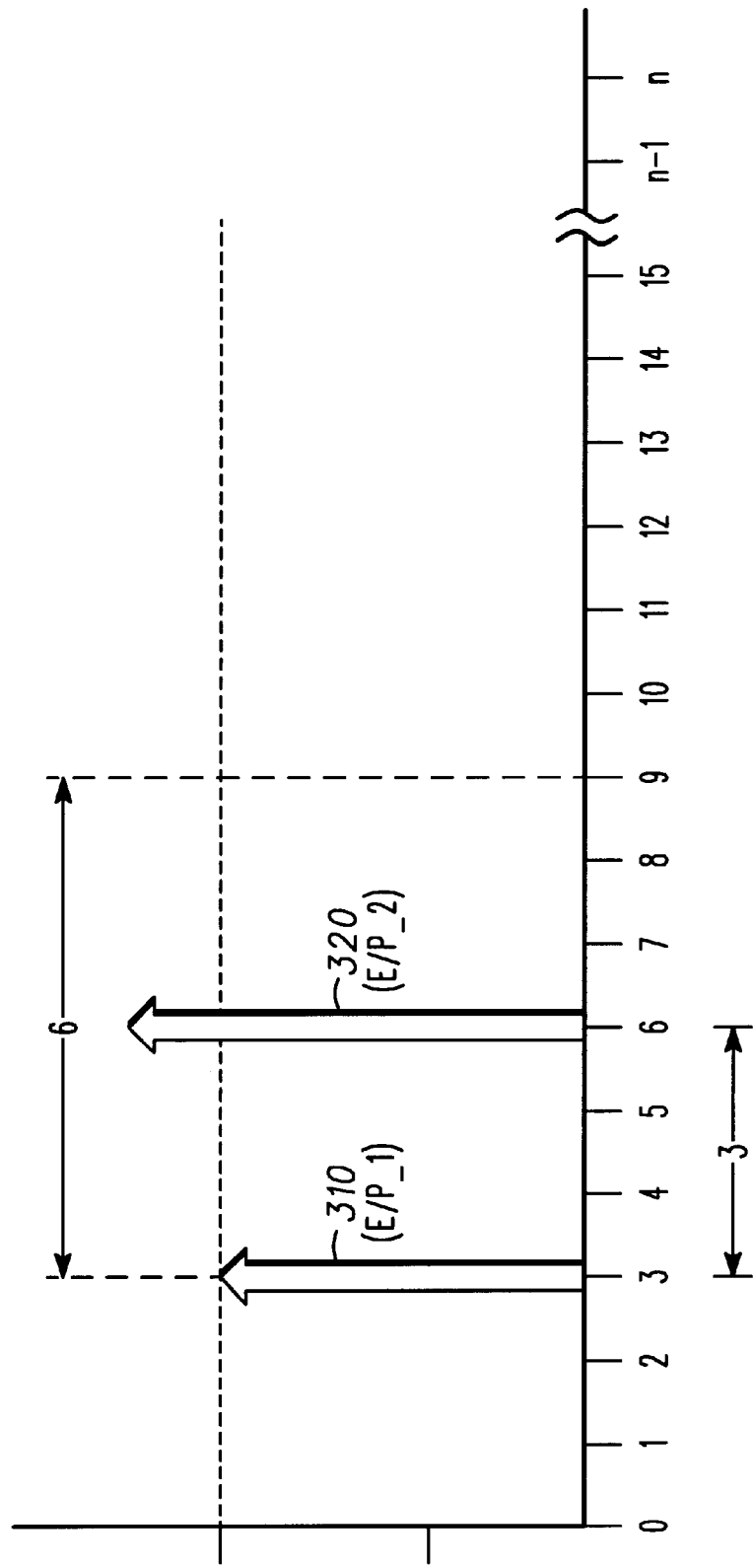
FIGS. 3, 4, 5 and 6 are visual representations of energy/position pairs associated with a synchronization code.

To illustrate the concept of reporting multi-path signals based on minimum separation, the mobile station 160 (e.g., via the searching unit 230) may initially generate a first energy/position pair 310 (E/P_1) that corresponds to the energy and position parameters of Position 3 as shown in FIG. 3, and the minimum separation associated with the first energy/position pair 310 (E/P_1) may set to a value of six (6) positions. Because initially there are no other energy/position pairs stored on the list of possible start points of the synchronization code, the mobile station 160 may store the first energy/position pair 310 (E/P_1) as a minimum energy/position pair (E/P_MIN) of the list. Persons of ordinary skill in the art will appreciate that the minimum energy/position pair (E/P_MIN) is the energy/position pair with the smallest energy parameter on the list. The list may be stored within a memory such as, but not limited to, the memory 260 and other storage medium within the mobile station 160 (not shown).

During the search, the mobile station 160 may generate a second energy/position pair 320 (E/P_2) corresponding to a second multi-path signal at Position 6. Accordingly, the mobile station 160 may determine whether the second energy/position pair 320 (E/P__2) may be within the minimum separation associated with the first energy/position pair 310 (E/P__1). To do so, the mobile station 160 may compare the position parameters of the first and second energy/position pairs 310, 320 (P__1 and P__2). Here, the mobile station 160 may detect that the position parameter of the second energy/position pair 320 (P__2) is within the minimum separation of six (6) positions of the position parameter of the first energy/position pair 310 (P__1). That is, Positions 3 and 6 are separated by only three (3) positions. Upon detecting that the first and second energy/position pairs 310, 320 (E/P__1 and E/P__2) do not satisfy the minimum separation associated with the first energy/position pair 310 (E/P__1), the mobile station 160 may compare the energy parameters of the first energy/position pair 310 (E/P__1) and the second energy/position pair 320 (E/P__2). In particular, the mobile station 160 may determine whether the energy parameter of the second energy/position pair 320 (E/P__2) is greater than the energy parameter of the first energy/position pair 310 (E/P__1). If the energy parameter of the second energy/position pair 320 (E/P__2) is greater than the energy parameter of the first energy/position pair 310 (E/P__1) as shown in FIG. 3, the mobile station 160 may replace the first energy/position pair 310 (E/P__1) on the list with the second energy/position pair 320 (E/P__2). In addition to replacing the first energy/position pair 310 (E/P__1) on the list, the second energy/position 320 (E/P__2) may also become the minimum energy/position pair (E/P__MIN) of the list because the mobile station 160 initially stored the first energy/position pair 310 (E/P__1) as the minimum energy/position pair (E/P__MIN).

Figure 4:
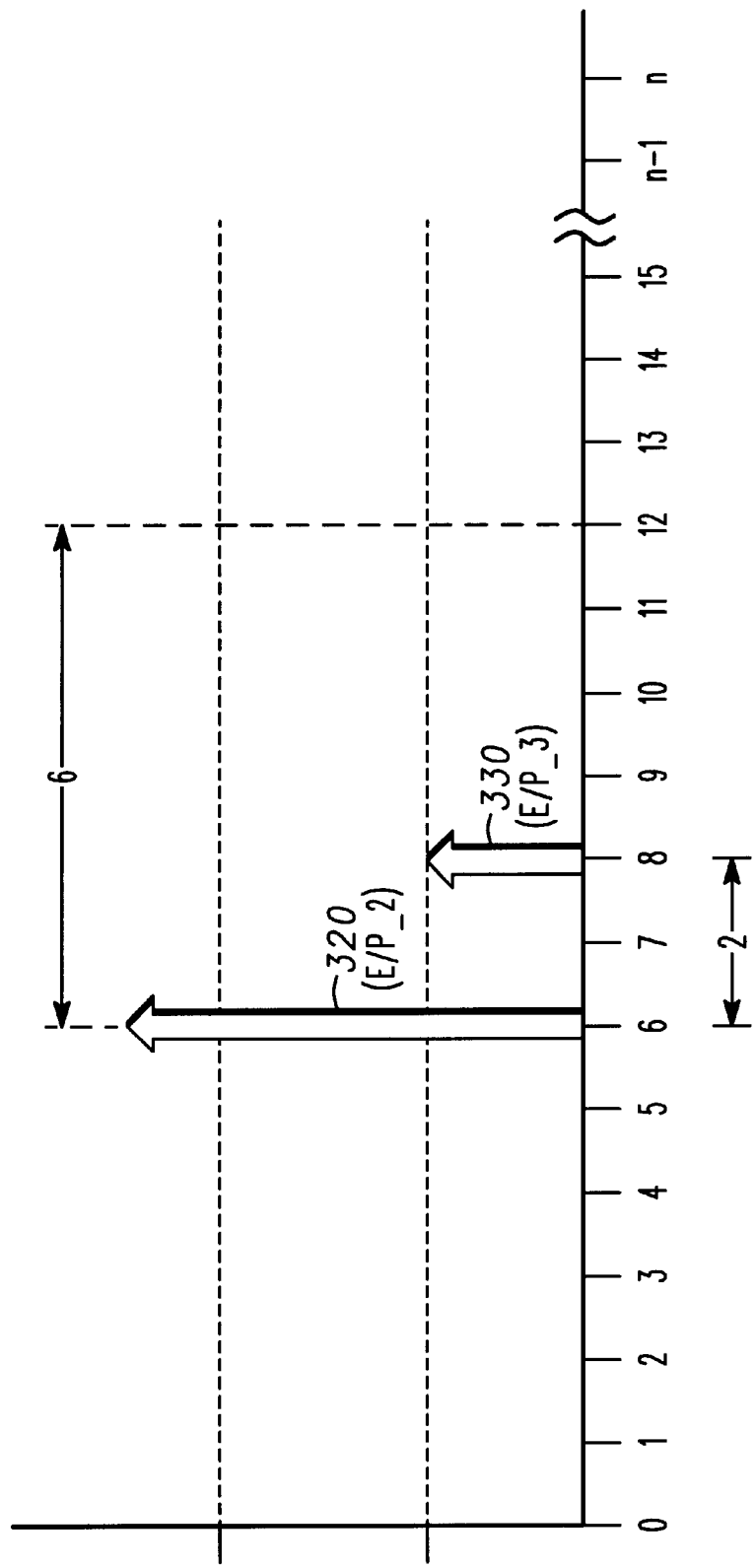

Referring to FIG. 4 and following the example described above, the mobile station 160 may generate a third energy/position pair 330 (E/P__3) corresponding to a third multi-path signal at Position 8. The position parameter of the third energy/position pair 330 (P__3) may violate the minimum separation of six (6) positions of the position parameter of the second energy/position pair 320 (P__2) (i.e., Positions 6 and 8 are separated by only two (2) positions. However, the mobile station 160 may not substitute the second energy/position pair 320 (E/P__2) on the list with the third energy/position pair 330 (E/P__3) because the energy parameter of third energy/position pair 330 (E__3) is greater than the energy parameter of the first energy/position pair 310 (E__1). That is, the energy at Position 8 is less than the energy at Position 6 so the third energy/position pair 330 (E/P__3) may not replace the second energy/position pair 320 (E/P__2) on the list.

Figure 5:
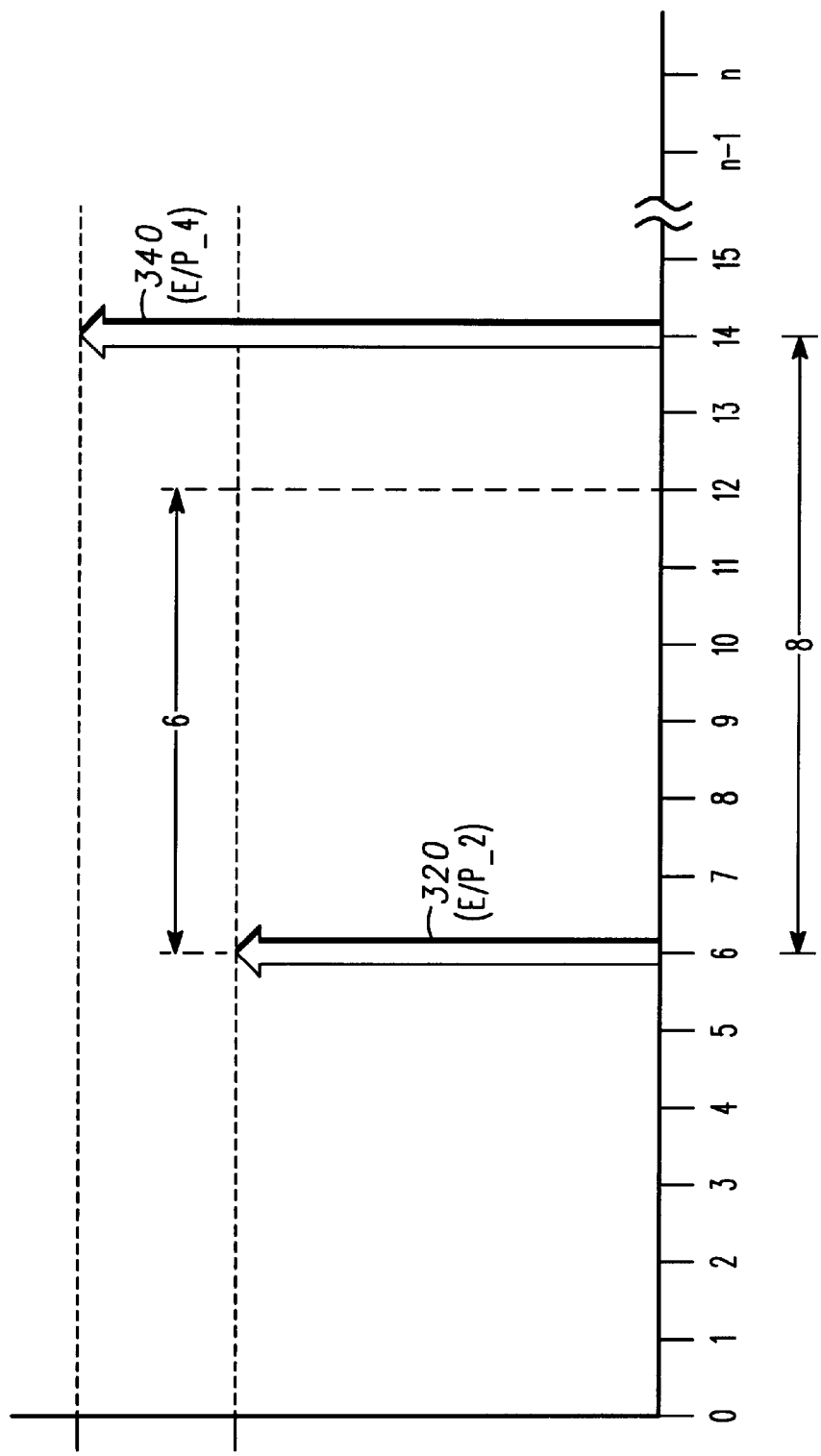

Further, the mobile station 160 may generate a fourth energy/position pair 340 (E/P__4) corresponding to a fourth multi-path signal at Position 14 as shown in FIG. 5. Although the energy parameter of the fourth energy/position pair 340 (E__4) may be greater than the energy parameter of the second energy/position pair 320 (E__2), the second energy/position pair 320 (E/P__2) may not be replaced by the fourth energy/position pair (E/P__4) 340 because the second and fourth energy/position pairs 320, 340 (E/P__2 and E/P__4) are separated by more than the minimum separation of six (6) positions. The position parameter of the fourth energy/position pair 340 (P__4) is outside of the minimum separation of the position parameter of the second energy/position pair 320 (P__2), i.e., Positions 6 and 14 are separated by eight (8) positions. However, the fourth energy/position pair 340 (E/P__4) may replace the second energy/position pair 320 (E/P__2) as the minimum energy/position pair (E/P__MIN) on the list because the energy parameter of the fourth energy/position pair 340 (E__4) is greater than the energy parameter of the second energy/position pair 320 (E__2).

Figure 6:
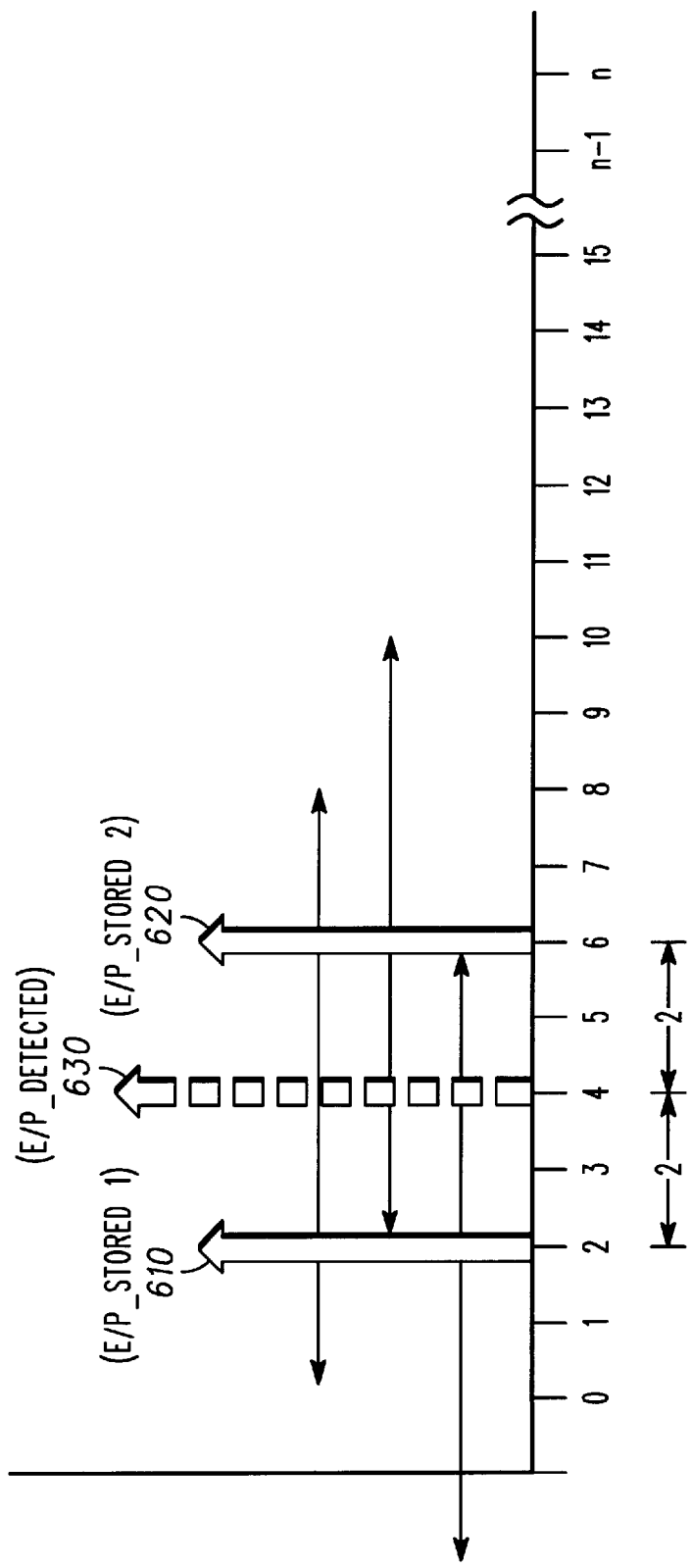

Because the surrounding environment of the mobile station 160 may change, the multi-path profile may also change accordingly. Thus, the mobile station 160 may repeat a search through the synchronization code, i.e., the search may last for a period greater than the length of the synchronization code. During an initial scan through the synchronization code, for example, the mobile station 160 may have generated and stored a plurality of energy/position pairs including a first stored energy/position pair 610 (E/P__STORED1) and a second stored energy/position pair 620 (E/P__STORED2) as shown in FIG. 6. The first stored energy/position pair 610 (E/P__STORED1) may correspond to Position 2, and the second stored energy/position pair 620 (E/P__STORED2) may correspond to Position 6. In a subsequent scan (e.g., a second scan through the synchronization code), the mobile station 160 may generate a third energy/position pair 630 corresponding to a multi-path signal at Position 4 (i.e., a detected energy/position pair (E/P__DETECTED)). If each of the minimum separations associated with the first and second stored energy/position pairs 610, 620 (E/P__STORED1 and E/P__STORED2) is set at a value of four (4) positions then the position parameter of the detected energy/position pair 630 (P__DETECTED) may violate the position parameters of both the first and second stored energy/position pairs 610, 620 (P__STORED1 and P__STORED2). Further, if the energy parameter of the detected energy/position pair 630 (E__DETECTED) is greater than the energy parameter of both the first and second stored energy/position pair 610, 620 (E__STORED1 and E__STORED2) then the detected energy/position pair 630 (E/P__DETECTED) may replace the first and second stored energy/position pairs 610, 620 (E/P__STORED1 and E/P__STORED2) on the list to reduce the number of stored energy/position pairs. For example, the first stored energy/position pair 610 (E/P__STORED1) may be deleted from the list with the addition of the detected energy/position pair 630 (E/P__DETECTED) onto the list. The energy parameter of the second stored energy/position pair 620 (E__STORED2) may be reset to zero, which effectively, deletes the second stored energy/position pair 620 (E__STORED2) from the list.

Figure 7:
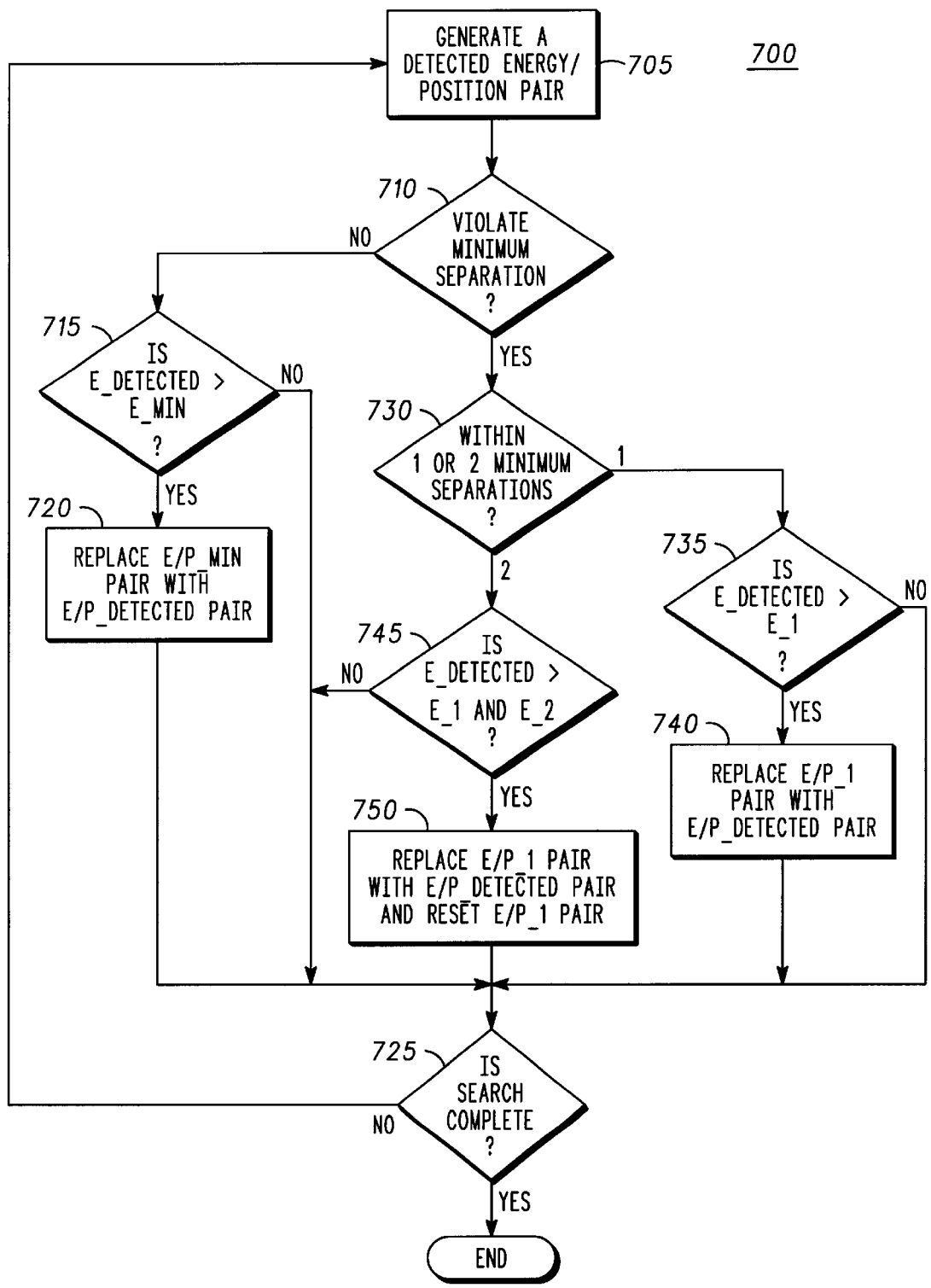
FIG. 7 is a flow diagram illustrating a method for reporting multi-path signals based on minimum separation.

One possible implementation of the computer program executed by the mobile station (e.g., via the processor 250) is illustrated in FIG. 7. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 7, persons of ordinary skill in the art will appreciate that these steps can be performed in other temporal sequences. Again, the flow chart 700 is merely provided as an example of one way to program the mobile station 160 to report multi-path signals based on minimum separation. The flow chart 700 begins at step 705, wherein the mobile station 160 may generate a detected energy/position pair (E/P__DETECTED) associated with a detected multi-path signal. The detected energy/position pair (E/P__DETECTED) may correspond to the energy parameter and the position parameter of the detected multi-path signal. At step 710, the mobile station 160 may determine whether the detected energy/position pair (E/P__DETECTED) violates a minimum separation associated with a stored energy/position pair (E/P__

STORED). That is, the mobile station 160 may compare the position parameters of the detected energy/position pair and the stored energy/position pair (P_DETECTED and P_1). The minimum separation may be, but is not limited to, a space separation and a time separation between the position parameters of the detected energy/position pair and the stored energy/position pair. In an example described above and with reference to FIG. 3, the energy/position pair corresponding to Position 6 may violate the minimum separation associated with the energy/position pair corresponding to Position 3 if the minimum separation is set to a value of four (4). Thus, the detected energy/position pair (E/P_DETECTED) may violate the minimum separation associated with the stored energy/position pair (E/P_1) if the position parameters of the detected energy/position pair and the stored energy/position pair (P_DETECTED and P_1) are not apart by more than the value of the minimum separation.

The mobile station 160 at step 710 may detect that the detected energy/position pair (E/P_DETECTED) does not violate the minimum separation associated with the stored energy/position pair (E/P_1). That is, the position parameters of the detected energy/position pair and the stored energy/position pair are separated by more than the minimum separation (P_DETECTED and P_1). Accordingly, the mobile station 160 at step 715 may determine whether the energy parameter of the detected energy/position pair (E_DETECTED) may be greater than the energy parameter of the minimum stored energy/position pair (E_MIN), i.e., the stored energy/position pair with the weakest energy parameter. An example of this concept is described above and shown in FIG. 5. In particular, if the energy parameter of the detected energy/position pair (E_DETECTED) is greater than the energy parameter of the minimum stored energy/position pair (E_MIN) then the mobile station 160 at step 720 may replace the minimum stored energy/position pair (E_MIN) on the list with the detected energy/position pair (E/P_DETECTED) as the energy/position pair with the weakest energy parameter (i.e., the minimum energy/position pair). Otherwise, the mobile station 160 may proceed to step 725 to determine whether the search for multi-path signals is completed. If the mobile station 160 determines that the search is not complete then the mobile station 160 may return to step 705 to continue with the search.

Referring back to step 710, if the mobile station 160 determines that the detected energy/position pair may (E/P_DETECTED) violate the minimum separation associated with a stored energy/position pair (E/P_1) then the mobile station 160 at step 730 may determine whether the detected energy/position pair (E/P_DETECTED) may be within the minimum separation associated with only one stored energy position pair or within the minimum separations associated with two stored energy/position pairs. If the detected energy/position pair may be within the minimum separation associated with a single stored energy/position pair then the mobile station at step 735 may determine whether the energy parameter of the detected energy/position pair (E_DETECTED) may be greater than the energy parameter of the single stored energy/position pair (E_1). If the energy parameter of the detected energy/position pair (E_DETECTED) is greater than the energy parameter of the single stored energy/position pair (E_1) then the mobile station 160 at step 740 may replace the stored energy/position pair (E/P_1) on the list with the detected energy/position pair (E/P_DETECTED), and then proceed to step 725 to determine whether the search may be completed. If the energy parameter of the detected energy/position pair (E_DETECTED) is less than the energy parameter of the single stored energy/position pair (E_1) then the mobile station 160 may proceed directly to step 725 without replacing the single stored energy/position pair (E/P_1).

Alternatively, the mobile station 160 at step 730 may determine that the detected energy/position pair (E/P_DETECTED) may be within the minimum separations associated with two stored energy/position pairs, i.e., a first and second energy/position pairs (E/P_1 and E/P_2). Accordingly, the mobile station 160 at step 745 may determine whether the energy parameter of the detected energy/position pair (E_DETECTED) may be greater than the energy parameter of the first energy/position pair (E_1) and the energy parameter of the second energy/position pair (E_2). An example of this concept is described above with reference to FIG. 6. In particular, if the energy parameter of the detected energy/position pair (E_DETECTED) is greater than then energy parameters of both the first and second energy/position pairs (E_1 and E_2) then the mobile station 160 at step 750 may replace the first energy/position pair (E/P_1) on the list with the detected energy/position pair (E/P_DETECTED) and also reset the second energy/position pair (E/P_2). That is, the mobile station 160 may set the energy parameter of the second energy/position pair (E_2) to zero, which effectively, removes the second energy/position pair (E/P_2) from the list. As a result, the number of stored energy/position pairs on the list.

Many changes and modifications to the embodiments described herein could be made. The scope of some changes is discussed above. The scope of others will become apparent from the appended claims.

What is claimed is:

1. In a wireless communication system, wherein a list includes a first energy/position pair, the first energy/position pair corresponding to the energy parameter and the position parameter associated with a first multi-path signal of a synchronization code, a mobile station for reporting multi-path signals based on minimum separation, the mobile station comprising:

a receiving unit operable to receive the first multi-path signal and a second multi-path signal;

a searching unit operable to generate a second energy/position pair associated with the second multi-path signal, the second energy/position pair corresponding to the energy parameter and the position parameter of the second multi-path signal;

a controller operatively coupled to the receiving unit and the searching unit, the controller comprising a processor and a memory operatively coupled to the processor, the controller being programmed to detect the position parameter of the second energy/position pair being within a minimum separation associated with the position parameter of the first energy/position pair, the controller being programmed to detect the energy parameter of the second energy/position pair being greater than the energy parameter of the first energy/position pair; and the controller being programmed to replace the first energy/position pair on the list with the second energy/position pair.

2. The mobile station of claim 1, wherein each of the first and second energy/position pairs corresponds the signal strength of a multi-path signal and the relative position within the synchronization code of the multi-path signal.

3. The mobile station of claim 2, wherein the controller is programmed to delete the first energy/position pair from the list and to store the second energy/position pair on the list.

4. The mobile station of claim 1, wherein the controller is programmed to delete the first energy/position pair from the list and to store the second energy/position pair on the list.

5. The mobile station of claim 1, wherein the first energy/position pair is a stored energy/position pair within a list including at least one energy/position pair.

6. The mobile station of claim 1 is operable in accordance with a code division multiple access (CDMA) based communication protocol.

7. The mobile station of claim 1, wherein the minimum separation is one of a minimum space separation and a minimum time separation.

8. In a wireless communication system, wherein a list includes a plurality of stored energy/position pairs, and wherein each of the plurality of stored energy/position pairs corresponds to an energy parameter and a position parameter associated with a multi-path signal of a synchronization code, a method for reporting multi-path signals based on minimum separation, the method comprising:

generating a detected energy/position pair associated with a detected multi-path signal, the detected energy/position pair corresponding to the energy parameter and the position parameter of the detected multi-path signal;

detecting the position parameter of the detected energy/position pair being within a minimum separation associated with each of the position parameters of a first stored energy/position pair and a second stored energy/position pair, each of the first and second stored energy/position pairs being one of the plurality of stored energy/position pairs on the list;

detecting the energy parameter of the detected energy/position pair being greater than each of the energy parameters of the first and second stored energy/position pairs; and replacing the first stored energy/position pair on the list with the detected energy/position pair; and deleting the second stored energy/position pair from the list.

9. The method of claim 8, wherein the step of detecting the position parameter of the detected energy/position pair being within a minimum separation associated with each of the position parameters of a first stored energy/position pair and a second stored energy/position pair comprises detecting the position parameter of the detected energy/position pair being within one of a minimum space separation and a minimum time separation associated with each of the position parameters of a first stored energy/position pair and a second stored energy/position pair.

10. The method of claim 8, wherein the step of generating a detected energy/position pair associated with a detected multi-path signal comprises generating a detected energy/position pair corresponding to the signal strength of the detected multi-path signal and the relative position within the synchronization code of the detected multi-path signal.

11. The method of claim 8, wherein the step of replacing the first stored energy/position pair on the list with the detected energy/position pair comprises:

deleting the first stored energy/position pair from the list; and storing the detected energy/position pair on the list.

12. The method of claim 8, wherein the step of deleting the second stored energy/position pair comprises resetting the energy parameter of the second stored energy/position pair to zero.

13. The method of claim 8, wherein the communication system comprises a code division multiple access (CDMA) based communication system.

14. In a wireless communication system, wherein a list includes a first energy/position pair, the first energy/position pair corresponding to the energy parameter and the position parameter associated with a first multi-path signal of a synchronization code, and wherein a processor operates in accordance with a computer program embodied on a computer-readable medium for reporting multi-path signals based on minimum separation, the computer program comprising:

a first routine that directs the processor to generate a second energy/position pair associated with a second multi-path signal, the second energy/position pair corresponding to the energy parameter and the position parameter of the second multi-path signal;

a second routine that directs the processor to detect the position parameter of the second energy/position pair being within a minimum separation associated with the position parameter of the first energy/position pair;

a third routine that directs the processor to detect the energy parameter of the second energy/position pair being greater than the energy parameter of the first energy/position pair; and a fourth routine that directs the processor to replace the first energy/position pair on the list with the second energy/position pair.

15. The computer program of claim 14, wherein the second routine comprises a routine that directs the processor to detect the position parameter of the second energy/position pair being within one of a minimum space separation and a minimum time separation associated with the first energy/position pair.

16. The computer program of claim 14, wherein the first routine comprises a routine that directs the processor to generate a second energy/position pair corresponding to the signal strength of the second multi-path signal and the relative position within the synchronization code of the second multi-path signal.

17. The computer program of claim 14, wherein the medium is one of paper, a programmable gate array, application specific integrated circuit, erasable programmable read only memory, read only memory, random access memory, magnetic media, and optical media.

18. The computer program of claim 14, wherein the fourth routine comprises a routine that directs the processor to delete the first energy/position pair from the list, and a routine that directs the processor to store the second energy/position pair on the list.

19. The computer program of claim 14, wherein the fourth routine comprises a routine that directs the processor to reset the energy parameter of the first energy/position pair to zero.

20. The computer program of claim 14 is operable in accordance with a code division multiple access (CDMA) based communication protocol.

21. In a wireless communication system, wherein a mobile station stores a list including at least one energy/position pair, and wherein the list includes a first energy/position pair corresponding to the energy parameter and the position parameter associated with a first multi-path signal of a synchronization code, a method for reporting multi-path signals based on minimum separation, the method comprising:

generating a second energy/position pair associated with a second multi-path signal, the second energy/position pair corresponding to the energy parameter and the position parameter of the second multi-path signal;

detecting the position parameter of the second energy/position pair being within a minimum separation associated with the position parameter of the first energy/position pair;

detecting the energy parameter of the second energy/position pair being greater than the energy parameter of the first energy/position pair; and replacing the first energy/position pair on the list with the second energy/position pair.

22. The method of claim 21, wherein the step of detecting the position parameter of the second energy/position pair being within a minimum separation associated with the position parameter of the first energy/position pair comprises detecting the position parameter of the second energy/position pair being within one of a minimum space separation and a minimum time separation associated with the first energy/position pair.

23. The method of claim 21, wherein the step of generating a second energy/position pair associated with a second multi-path signal comprises generating a second energy/position pair corresponding to the signal strength of the second multi-path signal and the relative position within the synchronization code of the second multi-path signal.

24. The method of claim 21, wherein the step of replacing the first energy/position pair on the list with the second energy/position pair comprises:

deleting the first energy/position pair from the list; and storing the second energy/position pair on the list.

25. The method of claim 21, wherein the step of replacing the first energy/position pair on the list with the second energy/position pair comprises resetting the energy parameter of the first energy/position pair to zero.

26. The method of claim 21, wherein the communication system comprises a code division multiple access (CDMA) based communication system.

\* \* \* \* \*